United States Patent [19]

Tanaka

[11] Patent Number: 4,760,733

[45] Date of Patent: Aug. 2, 1988

[54] METHOD OF DETECTING CYLINDER PRESSURE IN INTERNAL COMBUSTION ENGINE

[75] Inventor: Akira Tanaka, Wako, Japan

[73] Assignee: Honda Giken Kogyo Kabushiki Kaisha, Tokyo, Japan

[21] Appl. No.: 937,172

[22] Filed: Dec. 2, 1986

[30] Foreign Application Priority Data

Dec. 2, 1985 [JP] Japan .................................. 60-271123

[51] Int. Cl.$^4$ ............................................. G01L 23/22
[52] U.S. Cl. .......................................... 73/35; 73/115
[58] Field of Search .................... 73/35, 115; 123/425, 123/435

[56] References Cited

U.S. PATENT DOCUMENTS

| | | | |
|---|---|---|---|
| 3,678,732 | 7/1972 | Arrigoni et al. | 73/35 |
| 4,131,097 | 12/1978 | Sawada et al. | 123/117 R |
| 4,449,501 | 5/1984 | Greeves | 123/425 |
| 4,455,980 | 6/1984 | Sasayama et al. | 123/425 |
| 4,492,108 | 1/1985 | van Zanten | 73/35 |
| 4,567,751 | 2/1986 | Ootsuka et al. | 73/35 |
| 4,622,939 | 11/1986 | Matekunas | 123/425 |

FOREIGN PATENT DOCUMENTS 57-173565 10/1982 Japan .
58-33394 7/1983 Japan .
59-2796 1/1984 Japan .

Primary Examiner—Stewart J. Levy
Assistant Examiner—Robert P. Bell
Attorney, Agent, or Firm—Armstrong, Nikaido, Marmelstein & Kubovcik

[57] ABSTRACT

The output of a cylinder pressure sensor is digitally sampled and the rate of change of the sampled data is successively calculated. Each calculated rate of change is compared with that one sampling earlier and when the former is found to exceed the latter by more than a predetermined amount, it is determined that knocking has occurred. When knocking is not found, the sampled data at that time is defined to be the maximum cylinder pressure. At the same time, the maximum cylinder pressure angle is detemined by measuring the time lapse between a reference point such as piston TDC and the point of time at which the rate of change in the sampled date become zero and converting the measured time lapse into the corresponding change in crankshaft angle.

4 Claims, 4 Drawing Sheets

METHOD OF DETECTING CYLINDER PRESSURE IN INTERNAL COMBUSTION ENGINE

BACKGROUND OF THE INVENTION

1. Field of the Invention

This invention relates to a method of detecting cylinder pressure in an internal combustion engine and more particularly to a method for detecting the maximum cylinder pressure as well as, if desired, the crankshaft angle at which the maximum cylinder pressure occurred.

2. Description of the Prior Art

Recent years have seen extensive adoption of methods for detecting cylinder combustion pressure in internal combustion engines and for using the detected values to control the ignition timing and other operating parameters of the engine. For the required determination of the combustion pressure, and more specifically for the determination of the maximum cylinder pressure (Pmax), it has been the practice to employ a method as disclosed in Japanese Patent Publication No. 59(1984)-2796 in which a maximum pressure detection circuit is constituted using an operational amplifier, a capacitor and the like, the outputs of a pressure sensor are added and input to the detection circuit, whereby the maximum pressure value is determined, and the determined value is stored at the capacitor. Further, for detecting the crankshaft angle at which the maximum pressure was reached, i.e. the maximum cylinder pressure angle $\theta$pmax, there has conventionally been used a method such as that disclosed in Japanese Patent Publication No. 58(1983)-33394 in which the output of a pressure sensor is differentiated using a differentiation circuit and the result of the differentiation is applied to a comparison circuit for comparison with a predetermined value. However, as these prior art methods both rely on analog circuits for the detection, they are not totally satisfactory as regards accuracy or as regards tracking performance during highspeed engine operation. Another disadvantage of the conventional methods is that they require complicated circuitry.

As prior art technology aimed at overcoming the shortcomings of the aforesaid methods there can be noted Japanese Unexamined Patent Publication No. 57(1982)-173565 which relates to a method of using an A/D converter to A/D-convert the output of a cylinder pressure sensor once per a prescribed angle of crankshaft rotation and defining the crankshaft angle at the time the converted value reached maximum as the maximum cylinder pressure angle $\theta$pmax. Although this method discloses methods for detecting the cylinder pressure and determining the maximum pressure value and the crankshaft angle at which the maximum pressure value occurs, it is incapable of simultaneously determining the presence or absence of knocking on the basis of the detected cylinder pressure and in this respect leaves much to be desired.

SUMMARY OF THE INVENTION

An object of the invention is to provide a method of detecting cylinder pressure in internal combustion engines which is free of the above-mentioned defects of the prior art methods and which enables high accuracy and outstanding tracking performance in cylinder pressure detection.

Another object of the invention is to provide a method which is capable not only of detecting the maximum cylinder pressure and the maximum cylinder pressure angle, but also of simultaneously determining the presence or absence of knocking on the basis of the output of a pressure sensor.

The present invention accomplishes these objects by providing a method of detecting cylinder pressure in an internal combustion engine comprising the steps of digitally sampling the output data of a cylinder pressure sensor, calculating the rate of change of the sampled digital data and determining that knocking has occurred when the rate of change exceeds a predetermined value, and defining the maximum value of the sampled digital data to be the maximum cylinder pressure when it is not determined that knocking has occurred. The maximum cylinder pressure angle, i.e. the crankshaft angle at which the maximum cylinder pressure occurred, can also be detected.

BRIEF DESCRIPTION OF THE DRAWINGS

These and other objects and advantages of the present invention will be more apparent from the following description and drawings in which.

DESCRIPTION OF THE PREFERRED EMBODIMENTS

The detection method according to the invention will be explained in conjunction with the device for carrying it out shown in FIG. 1.

Figure 1:
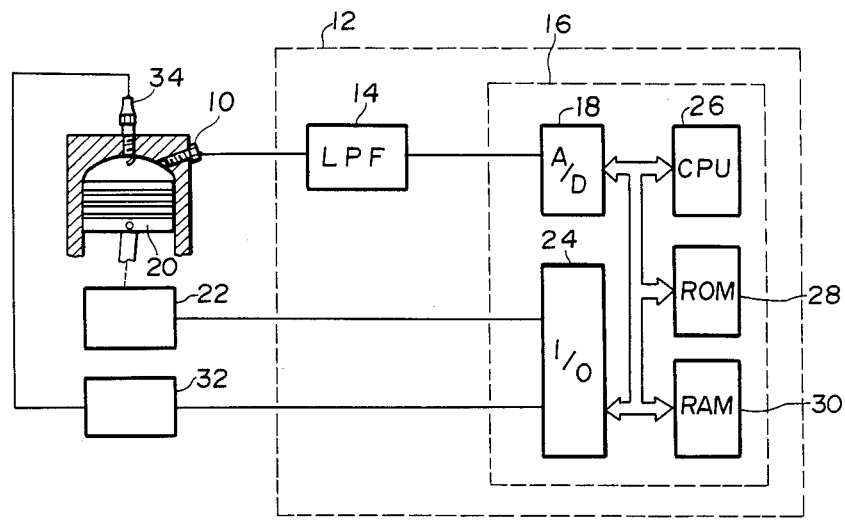
FIG. 1 is a block diagram showing the structure of a device for carrying out the method of the present invention.

In the detection device of FIG. 1, a piezoelectric pressure sensor 10 is provided to face into a combustion chamber of an internal combustion engine. The output of the pressure sensor 10 is applied to a charge amplifier (not shown) for charge-voltage conversion and, after being adjusted to an appropriate pulse width, is sent to a control unit 12, where it is first passed through a low pass filter 14. The cutoff of the low pass filter is set at a higher frequency than that expected to arise upon the occurrence of knocking so that when the sensor output passed through the low pass filter 14 is forwarded to a microcomputer 16 it still contains any knocking frequency component of the original output. In the microcomputer 16, the sensor output is first applied to an A/D converter 18 for conversion into a digital signal. On the other hand, a crankshaft angle sensor 22 for detecting the crankshaft angle of a crankshaft (not shown) to which a piston 20 is connected is provided at an appropriate location as, for example, within a distributor (not shown) associated with the engine. Once per prescribed angles of crankshaft rotation, the crankshaft angle sensor 22 produces a cylinder identification signal, piston TDC signals and unit angle signals, all of which are input to the microcomputer 16 via an I/O board 24 thereof.

The microcomputer 16 comprises a central processing unit (CPU) 26, a read-only memory (ROM) 28 and a random access memory (RAM) 30. The CPU 26 computes the proper ignition timing from the input data using the ROM 28 and the RAM 30 and outputs a command to ignite the air and fuel mixture within the cylinder combustion chamber via an igniter 32, a distributor (not shown) and a spark plug 34.

The method of detecting cylinder pressure according to the present invention will now be explained. As shown by the flowchart outlining the method in FIG. 2, the output of the pressure sensor 10 is digitally sampled (step 50), the rate of change of the so-obtained digital data is calculated (step 52), knocking is determined to have occurred when the rate of change exceeds a predetermined value (steps 54, 56), and the maximum value of the sampled digital data is defined to be the maximum cylinder pressure when it is not determined that knocking has occurred (step 58). As will be shown later, the maximum cylinder pressure angle can be detected at the same time.

The method of detection according to the flowchart of FIG. 2 will now be explained with reference to the diagrams in FIG. 3. After the pressure sensor output signal has passed through the low pass filter 14, it is converted into digital values at a predetermined sampling rate (defined in terms of the sampling interval "tsamp"). Considering that the engine will be operated at high speed, a sampling interval in the range of 10-25 $\mu$s is preferable. Defining the digital values as "pn−1, pn . . . ", and the difference therebetween as "ps" (=pn−pn−1), the absolute rate of change "an" is $$an = \frac{|ps|}{tsamp}$$

Therefore, defining the absolute rate of change one sampling earlier as "an−1", it is possible to discriminate the change in gradient of the pressure waveform by comparing an and an−1.

Figure 2:
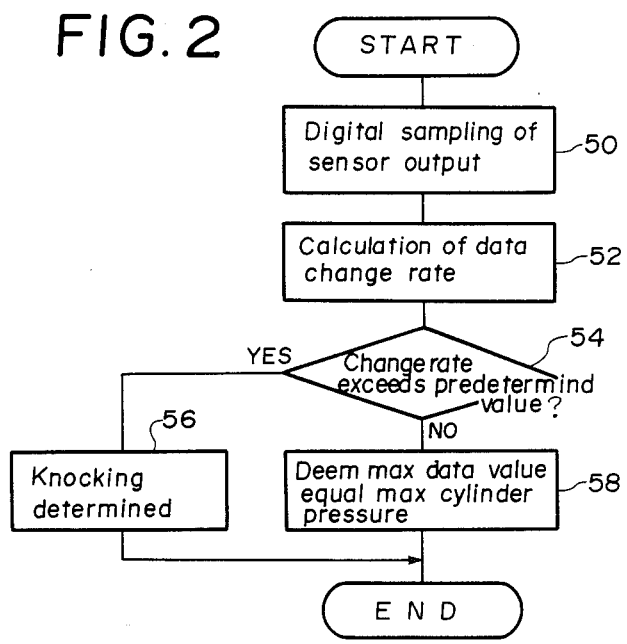
FIG. 2 is a flowchart showing the general idea of the detection method according to the invention.
Figure 3:
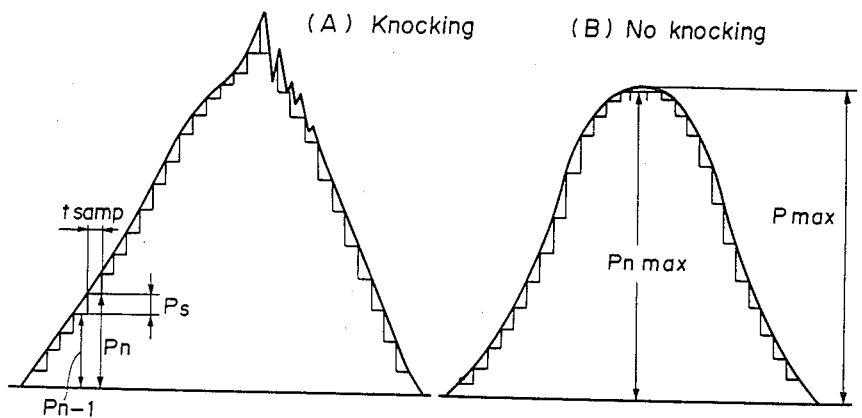
FIG. 3 shows two diagrams for explaining the detection method according to the flowchart of FIG. 2.
Figure 4:
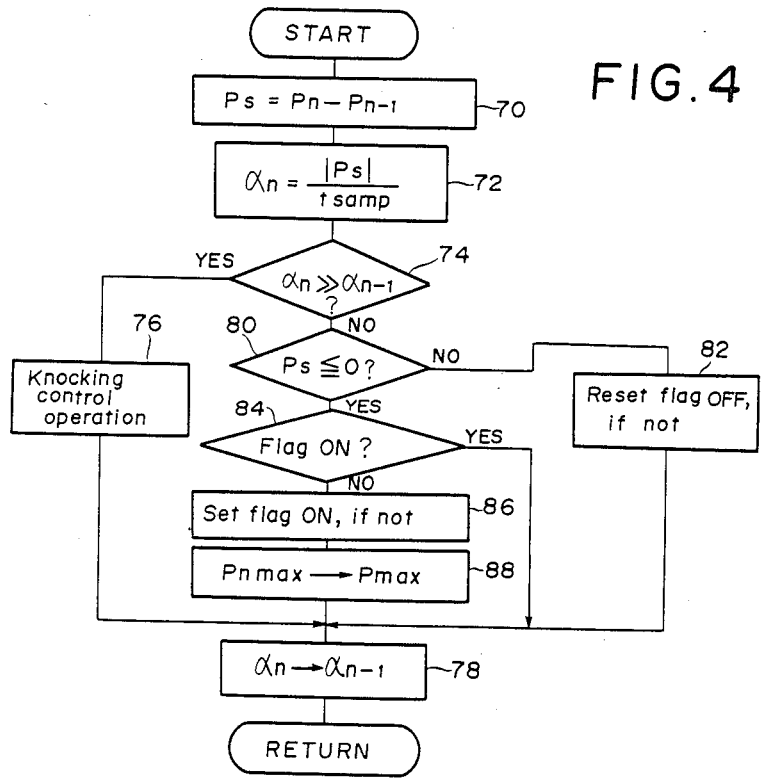
FIG. 4 is a flowchart showing the detection method of the flowchart of FIG. 2 in greater detail.

Referring to the flowchart in FIG. 4, which shows the detection method of the present invention illustrated in FIG. 2 in greater detail, in step 70 the difference "ps" between two adjacent digital datum "pn−1" and "pn" is calculated. Next, in step 72, the absolute change rate "an" is calculated by dividing the difference "ps" by the predetermined sampling interval "tsamp" and in step 74 is compared with the absolute change rate an−1 one time earlier. (For the first calculation, an appropriate initial value is set for an−1 and from the second calculation the value calculated for an one calculation earlier is used as the value of an−1.)

In step 74, when the result of the comparison is that the current absolute change rate an exceeds the absolute change rate an−1 one time earlier (or the initially set value) by not less than a predetermined amount, this is deemed to constitute an abnormally large variation in the change rate and it is decided that a jagged waveform indicative of knocking has occurred. In this case, the procedure moves to a separate knocking control operation involving compensatory ignition retarding or the like (step 76). At the same time, the current absolute change rate an is redefined as an−1 for use in the next calculation (step 78). The procedure then returns to step 70.

If knocking occurs as shown by FIG. 3(A), this can be determined from the fact that the consequent sharp rise in sensor output will cause the difference between the absolute change rates an and an−1 to exceed the predetermined value. Therefore, the predetermined value may be set at any appropriate level or, put differently, at any level sufficient for discriminating between the knocking and non-knocking states.

In step 74, if the difference between an and an−1 is found to be less than the prescribed value, the procedure moves to step 80 where it is decided whether the difference "ps" is zero or negative. Since the result of this decision will be YES only if the sampling has been made at or after the peak of the waveform (in which case the difference between successive digital values or "ps" will be zero or negative, respectively), it can be presumed that the peak has not been reached yet if the result of the decision is NO. In the case of a NO decision, therefore, after resetting the flag, OFF at step 82 which will be explained with reference to step 84, the current absolute change rate an is redefined as an−1 for use in the next calculation (step 78) and the procedure returns to step 70.

When the decision is YES in step 80, it is determined in step 84 whether this is the first affirmative decision made in this step 84 by checking whether or not the flag is set. If the flag bit is not on, the flag is now set (step 86) and, since the occurrence of this first YES decision in step 84 means that the peak of the waveform has been reached, the largest of the data pn, pn−1, . . . up to this time (pnmax) is in step 88 deemed to approximate the maximum cylinder pressure (Pmax). (See FIG. 3(B).) Then the current absolute change rate an is redefined as an−1 for use in the next calculation (step 78) and the procedure returns to step 70. Even after the peak of the waveform has been passed, the procedure of the flowchart is continued for the purpose of determining whether knocking occurs. If knocking is found to occur, a knocking control operation is initiated through step 76, and if no knocking is found, the procedure returns to step 70 without further calculation of a maximum cylinder pressure since the flag bit has already been once set (steps 80, 84, 86). Although the detection of the maximum cylinder pressure is based on an approximation, the result can be made substantially equal to the actual value by making the sampling interval "tsamp" adequately small.

Figure 5:
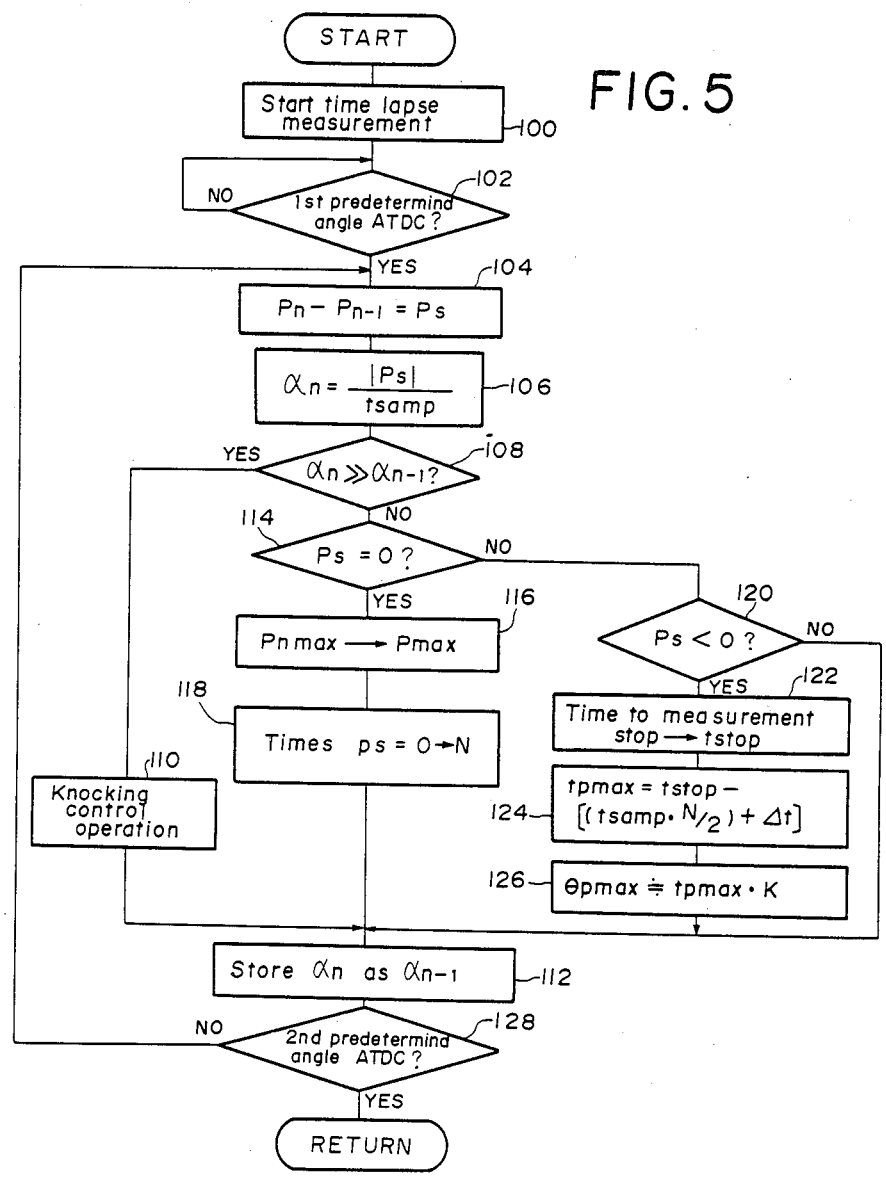
FIG. 5 is a flowchart illustrating a second embodiment of the detection method according to the present invention.
Figure 6:
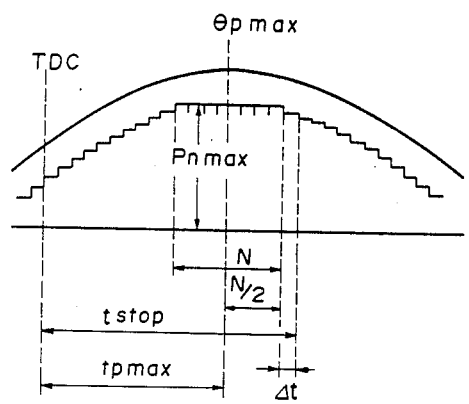
FIG. 6 is a diagram for explaining the detection method according to the flowchart of FIG. 5.

FIG. 5 shows another embodiment of the detection method of the present invention. In this embodiment the maximum cylinder pressure angle ($\theta$pmax) is detected together with maximum cylinder pressure (Pmax). The calculation method is shown in FIG. 6.

In step 100 of FIG. 5, starting from the instant of arrival of a piston TDC signal from the crankshaft angle sensor 22, time lapse measurement is started by counting the clock pulses of a clock (not shown) built into the microcomputer 16. In the succeeding step 102, when it has been confirmed that the crankshaft has rotated by a first predetermined angle following the arrival of the piston TDC signal, the rate of change is calculated in the same manner as in the first embodiment and discrimination and decision are conducted with respect to the calculated result (steps 104–112). The reason for carrying out the calculation, discrimination and decision operations after the crankshaft has rotated by a predetermined angle is to limit the region to be investigated to the minimum required.

Next in step 114, it is determined whether the peak of the waveform has been reached on the basis of whether or not the difference "ps" is zero. When it is found that the cylinder pressure has peaked, the maximum value of the data, i.e. pnmax, is deemed to approximate the maximum cylinder pressure Pmax (step 116), in the same manner as in the first embodiment. Then the number of times that "ps" was found to equal zero is counted and the sum "N" is stored in the RAM 30 (step 118). The reason for operation is that since the sampling interval is made shorter than that in the first embodiment, the peak of the sensor output waveform will include a flat region over which the relation "ps=0" will hold over several successive sampling, making it desirable to select the midpoint of this flat region as corresponding to the maximum cylinder pressure angle θpmax.

That is to say, when the termination of the flat region has been confirmed in step 120 from the fact that the difference "ps" has turned negative, the aforesaid time lapse measurement is discontinued and the period of time up to the discontinuation of time lapse measurement is defined as "tstop" (step 122). Here, defining the time lapse up to the position corresponding to the maximum cylinder pressure angle θpmax as "tpmax", the lapsed time "tpmax" can be calculated as $$tpmax = tstop - ((tsamp \times \tfrac{1}{2}N) + \Delta t$$

where $\Delta t$ is the time required to confirm that the flat region has ended. (Step 124)

θpmax is now obtained by multiplying the lapsed time "tpmax" by a time/angle conversion factor "k" (step 126). The conversion factor "k" is calculated as $$k = (\text{engine rpm} \times 360 \text{ (degrees)})/60 \text{ (sec)}$$

After completion of the steps 110, 118, 120 and 126, the current change rate $an$ is redefined as $an-1$ for use in the next comparison (step 112) and repetition of the procedures of the flowchart is continued until the second predetermined crankshaft angle has been reached (step 128).

Figure 7:
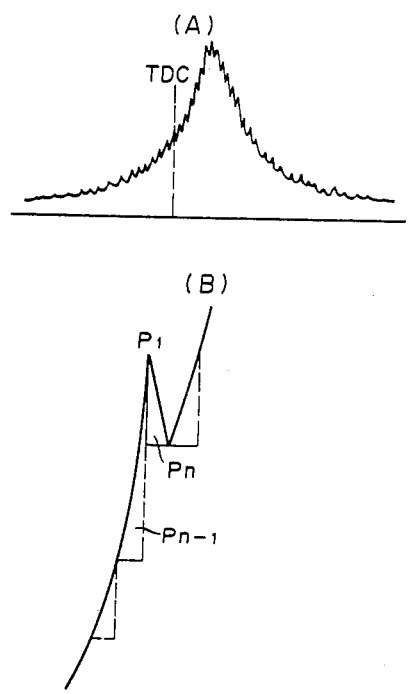
FIGS. 7 and 8 are diagrams for explaining the case where a blind zone is provided.
Figure 8:
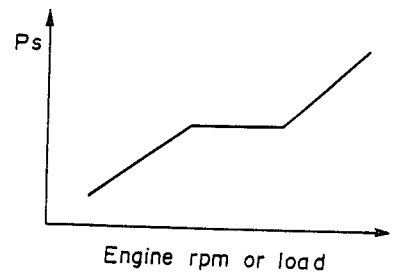

When an ignition device or the like employing high-voltage siwtching is used in conjunction with the first or second embodiments described above, there is a possibility that the output of the cylinder pressure sensor will be affected by noise, giving rise to fine ripples in the output waveform as shown in FIG. 7(A). In such a case, if a point at which difference "ps" becomes zero or turns negative is defined as the point of maximum cylinder pressure, it is possible that, as shown in FIG. 7(B), a minor peak "p1" present in the waveform prior to the actual peak thereof will be misidentified as the point of maximum cylinder pressure. Therefore, it is preferable to establish a blind zone of predetermined width with respect to the value of "ps". That is, it is preferable to define that all values of "ps" within a predetermined range of values are equal to a single constant value, in this way avoiding the possibility of a minor peak being misidentified as the point of maximum cylinder pressure. FIG. 8 shows an example of how the blind zone can be set in relation to the engine rpm or the engine load.

As the present invention provides a method for detecting cylinder pressure in which the output of a pressure sensor is subjected to high-speed A/D conversion and the rate of change in the digital data is determined, it enables not only the determination of the maximum cylinder pressure and the maximum cylinder pressure angle but also the detection of whether or not knocking has occurred. Moreover, it permits accurate determination of the maximum cylinder pressure, the maximum cylinder pressure angle and the presence or absence of knocking without need for storing large quantities of data in memory, and exhibits excellent tracking performance even during high-speed engine operation.

While the above description discloses preferred embodiments of the invention, it is to be understood that numerous modifications or alterations may be made without departing from the scope of the invention as set forth in the following claims.

What is claimed is:

1. A method of detecting cylinder pressure in an internal combustion engine, comprising the steps of:
    digitally sampling the output data of a cylinder pressure sensor;
    calculating a current rate of change in the cylinder pressure by dividing a difference in the sampled data between consecutive points of the digitally sampled output data of cylinder pressure sensor by a time interval and comparing the current rate of change with a previous rate of change obtained one time earlier;
    determining that knocking has occurred if the current rate of change exceeds the previous rate of change by a predetermined amount;
    determining whether the difference between the sampled data becomes zero after determining that knocking has not occurred;
    defining the maximum value of the sampled digital data to be the maximum cylinder pressure when the difference between the sampled data becomes zero; and
    determining whether the difference between the sampled data has turned negative and if negative, determining the crankshaft angle at which the maximum cylinder pressure occurs from a position at which the difference between the sampled data has turned negative.

2. A method according to claim 1, wherein the determination of the crankshaft angle comprising the steps of:
    measuring a measured time lapse from a reference point to a point where the difference between the sampled data has turned negative;
    counting the number of times that the difference between the sampled data is found to be zero;
    calculating a maximum time lapse from the reference point to a position corresponding to the crankshaft angle at which the maximum cylinder pressure occurs by multiplying half the number of times the difference between the sampled data is zero times the time interval and subtracting this result from the measured time lapse; and
    calculating the crankshaft angle by multiplying the maximum time lapse by a time/angle conversion factor.

3. A method according to claim 2, wherein calculation of the maximum time lapse contains a deviation in time for confirming that the maximum cylinder pressure has occurred.

4. A method according to claim 1, wherein a blind zone is established with respect to the current rate of change wherein in said blind zone, a predetermined range of differences in the sampled data is set equal to a predetermined value.

* * * * *